United States Patent
Kim et al.

(10) Patent No.: US 11,795,299 B2
(45) Date of Patent: *Oct. 24, 2023

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Yun Ki Cho, Daejeon (KR); Woo Hyuk Choi, Daejeon (KR); Jeong Ju Moon, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/050,933

(22) PCT Filed: Jun. 3, 2019

(86) PCT No.: PCT/KR2019/006653
§ 371 (c)(1),
(2) Date: Oct. 27, 2020

(87) PCT Pub. No.: WO2019/240418
PCT Pub. Date: Dec. 19, 2019

(65) Prior Publication Data
US 2021/0301104 A1 Sep. 30, 2021

(30) Foreign Application Priority Data

Jun. 12, 2018 (KR) .................. 10-2018-0067653

(51) Int. Cl.
*C08K 5/12* (2006.01)
*C08K 5/00* (2006.01)
*C08K 5/1515* (2006.01)
*C08L 101/00* (2006.01)

(52) U.S. Cl.
CPC ............. *C08K 5/12* (2013.01); *C08K 5/0016* (2013.01); *C08K 5/1515* (2013.01); *C08L 101/00* (2013.01)

(58) Field of Classification Search
CPC ..... C08L 27/06; C08L 101/00; C08K 5/0016; C08K 5/12; C08K 2201/014; C08K 5/11
See application file for complete search history.

(56) References Cited

U.S. PATENT DOCUMENTS

| | | | |
|---|---|---|---|
| 7,297,738 B2* | 11/2007 | Gosse | C08K 5/12 524/285 |
| 10,329,402 B2 | 6/2019 | Pfeiffer et al. | |
| 2007/0293646 A1* | 12/2007 | Gosse | C08K 5/0016 526/344 |
| 2009/0312470 A1 | 12/2009 | Bradshaw et al. | |
| 2010/0093885 A1* | 4/2010 | Hansel | C08K 5/103 523/100 |
| 2010/0113664 A1 | 5/2010 | Bradshaw et al. | |
| 2010/0298477 A1* | 11/2010 | Godwin | C08L 27/06 524/285 |
| 2010/0305250 A1* | 12/2010 | Colle | C08K 5/12 524/112 |
| 2011/0281987 A1 | 11/2011 | Godwin et al. | |
| 2013/0078474 A1 | 3/2013 | Muenter et al. | |
| 2014/0213709 A1 | 7/2014 | Dakka et al. | |
| 2017/0088691 A1* | 3/2017 | Woldt | C08K 5/0016 |
| 2017/0145186 A1* | 5/2017 | Pfeiffer | C08K 5/12 |
| 2017/0313850 A1 | 11/2017 | Pfeiffer et al. | |

(Continued)

FOREIGN PATENT DOCUMENTS

| CN | 103205067 A | 7/2013 |
|---|---|---|
| CN | 105924853 A | 9/2016 |
| CN | 107108958 A | 8/2017 |

(Continued)

OTHER PUBLICATIONS

Machine translation of JP 2013147519 A to Kikuchi et al., published Aug. 1, 2013 (Year: 2013).*

(Continued)

*Primary Examiner* — Jane L Stanley

(74) *Attorney, Agent, or Firm* — Bryan Cave Leighton Paisner LLP

(57) ABSTRACT

Provided is a plasticizer composition including a cyclohexane-1,2-diester-based material of Formula 1 and a trimellitate-based material of Formula 2:

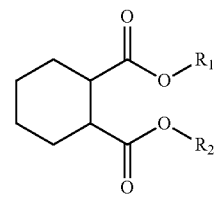

[Formula 1]

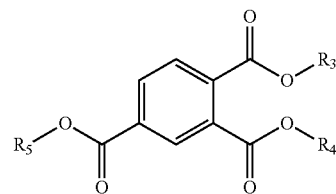

[Formula 2]

wherein in Formula 1 and Formula 2, $R_1$ to $R_5$ are each independently an alkyl group of 8 to 10 carbon atoms.

12 Claims, No Drawings

(56) References Cited

U.S. PATENT DOCUMENTS

2018/0291178 A1    10/2018  Kim et al.

FOREIGN PATENT DOCUMENTS

| | | |
|---|---|---|
| CN | 107768037 A | 3/2018 |
| EP | 2810932 A1 | 12/2014 |
| JP | 2012-166483 | 9/2012 |
| JP | 2013119623 A | 6/2013 |
| JP | 2013-147519 | 8/2013 |
| JP | 2013-147520 | 8/2013 |
| JP | 2015-193817 | 11/2015 |
| KR | 10-0957134 | 5/2010 |
| KR | 10-2016-0134521 | 11/2016 |
| KR | 10-2017-0066547 | 6/2017 |
| TW | 201619119 A | 6/2016 |
| WO | 2010071717 A1 | 6/2010 |
| WO | 2011-071674 | 6/2011 |
| WO | 2011147519 A1 | 12/2011 |
| WO | 2018008914 A1 | 1/2018 |

OTHER PUBLICATIONS

Machine translation of JP 2013147520 A to Kubo et al. published Aug. 1, 2013 (Year: 2013).*
Zhang et al., "Synthesis and Application of a New Environmental Friendly Plasticizer," American Journal of Biomedical Science and Engineering 1(1): 9-19, published online Jan. 30, 2015.

* cited by examiner

PLASTICIZER COMPOSITION AND RESIN COMPOSITION INCLUDING THE SAME

CROSS-REFERENCE TO RELATED APPLICATIONS

This application is a National Stage Application of International Application No. PCT/KR2019/006653 filed on Jun. 3, 2019, which claims priority to and the benefit of Korean Patent Application No. 10-2018-0067653, filed on Jun. 12, 2018, in the Korean Intellectual Property Office, the disclosures of which are incorporated herein by reference in their entirety.

TECHNICAL FIELD

The present invention relates to a plasticizer composition and a resin composition including the same, and a plasticizer composition which is eco-friendly and of which safety and basic physical properties are excellent, and a resin composition including the same.

BACKGROUND

In polyvinyl chloride compound industries, which require high heat resistance and low volatile loss as main physical properties required, a plasticizer has to be used properly according to use. For example, in a polyvinyl chloride compound used for a wire and a cable, one or more selected from the group consisting of a plasticizer, a filler, a stabilizer, a lubricant and a flame retardant can be mixed as an additive with polyvinyl chloride according to tensile strength, elongation rate, plasticization efficiency, volatile loss, tensile strength, elongation rate, tensile retention and elongation retention.

Recently, diisodecyl phthalate, which is a typically used plasticizer in wire compound and car material industries, is an observation substance as an environmental hormone, and its use is being regulated. Accordingly, the development of an eco-friendly plasticizer which can replace diisodecyl phthalate is required.

However, development of an eco-friendly plasticizer which has equivalent or better physical properties than diisodecyl phthalate is insufficient up to now.

PRIOR ART DOCUMENT

Patent Document (Patent Document 1) KR10-0957134B

DISCLOSURE OF THE INVENTION

Technical Problem

An aspect of the present invention provides a plasticizer composition which is eco-friendly and of which safety is excellent.

In addition, another aspect of the present invention provides a plasticizer composition having excellent basic physical properties such as plasticization efficiency, migration resistance, volatile loss, tensile strength, tensile retention, elongation rate, elongation retention, absorption rate and stress resistance.

Technical Solution

According to an aspect of the present invention, there is provided a plasticizer composition including a cyclohexane-1,2-diester-based material of the following Formula 1; and a trimellitate-based material of the following Formula 2:

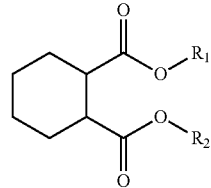

Formula 1

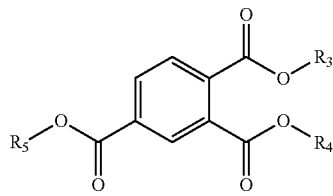

Formula 2 wherein in Formula 1 and Formula 2:

$R_1$ to $R_5$ are each independently an alkyl group of 8 to 10 carbon atoms.

In addition, there is provided in the present invention, a resin composition including 100 parts by weight of a resin and 5 to 150 parts by weight of the plasticizer composition.

Advantageous Effects

The plasticizer composition of the present invention is eco-friendly and has excellent safety and basic physical properties.

Accordingly, if the plasticizer composition of the present invention is included in a resin composition, the resin composition becomes eco-friendly and exhibits excellent safety, and can achieve equivalent or better plasticization efficiency, migration resistance, volatile loss, tensile strength, tensile retention, elongation rate, elongation retention, absorption rate and stress resistance when compared with diisodecyl phthalate.

DETAILED DESCRIPTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

In the present invention, an alkyl group can be a linear or branched alkyl group, and can be an n-octyl group, an isooctyl group, a tert-octyl group, a neo-octyl group, a n-nonyl group, an isononyl group, a tert-nonyl group, a neo-nonyl group, an n-decyl group, an isodecyl group, a tert-decyl group, a neo-decyl group, a 2-propylpentyl group, a 1-methyloctyl group, a 2-methyloctyl group, a 4-methyloctyl group, a 5-methyloctyl group, a 6-methyloctyl group, a 7-methyloctyl group, etc., but is not limited thereto.

In the present invention, an alcohol can be a linear alcohol or a branched alcohol, and can be n-octanol, isooctanol, tert-octanol, neo-octanol, n-nonanol, isononanol, tert-nonanol, neo-nonanol, n-decyl alcohol, isodecyl alcohol, tert-decyl alcohol, neo-decyl alcohol, 2-ethylhexanol, 1-methylheptanol, 1-ethylheptanol, 2-ethylheptanol, 2,2-dimethylheptanol, 2-propylheptanol, 2-propylpentanol, 1-methyloctanol, 2-methyloctanol, 4-methyloctanol, 5-methyloctanol, 6-methyloctanol, 7-methyloctanol, etc., but is not limited thereto.

1. Plasticizer Composition

The plasticizer composition according to an embodiment of the present invention includes: 1) a cyclohexane-1,2-diester-based material of the following Formula 1; and 2) a trimellitate-based material of the following Formula 2:

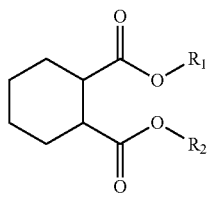

Formula 1

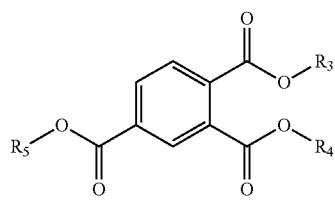

Formula 2 wherein in Formula 1 and Formula 2:

$R_1$ to $R_5$ are each independently an alkyl group of 8 to 10 carbon atoms.

In addition, the plasticizer composition according to an embodiment of the present invention can further include 3) an epoxidized oil.

In addition, the plasticizer composition according to an embodiment of the present invention can further include 4) a compound of the following Formula 3:

$$R_6-O-C(=O)-X-C(=O)-O-R_7$$ Formula 3 wherein in Formula 3:

X is a linear or branched alkylene group of 2 to 8 carbon atoms, or a linear or branched alkenylene group of 2 to 8 carbon atoms containing at least one double bond; and $R_6$ and $R_7$ are each independently an alkyl group of 3 to 5 carbon atoms.

Hereinafter, configuration elements according to an embodiment of the present invention will be explained in detail.

1) Cyclohexne-1,2-Diester-Based Material

The cyclohexane-1,2-diester-based material has a structure of Formula 1 and can impart the plasticizer composition with eco-friendly properties by excluding a phthalate component. In addition, properties of the plasticizer composition, such as the plasticization efficiency, elongation rate, etc., can be further improved.

If the bonding positions of the ester groups in the cyclohexane are not 1- and 2-, defects of degrading compression migration and stress migration can arise.

In the cyclohexane-1,2-diester-based material, two groups, $R_1$ and $R_2$, which are bonded to ester groups, are each independently an alkyl group of 8 to 10 carbon atoms. If an alkyl group having less than 8 carbon atoms is combined, it is understood that mechanical properties such as volatile loss, migration loss and tensile strength are degraded, and absorption rate or gelling becomes too fast, and thus, processability can be adversely affected, and if an alkyl group having greater than 10 carbon atoms is combined, absorption rate, processability and plasticization efficiency can be adversely affected. In order to optimize such effects, preferably, an alkyl group of 8 to 10 carbon atoms, or an alkyl group of 8 to 9 carbon atoms can be selected.

$R_1$ and $R_2$ can be the same or different, and can be each independently one selected from the group consisting of an n-octyl group, an isooctyl group, a 2-ethylhexyl group, a n-nonyl group, an isononyl group, a 2-propylheptyl group, and an isodecyl group, and among them, one selected from the group consisting of a 2-ethylhexyl group, an isononyl group, a 2-propylheptyl group, and an isodecyl group is preferable.

In case of directly preparing the cyclohexane-1,2-diester-based material of Formula 1, direct esterification reaction or transesterification reaction of cyclohexane-1,2-dicarboxylic acid or the derivative thereof with an alcohol can be performed for the preparation.

The derivative of cyclohexane-1,2-dicarboxylic acid can be one or more selected from the group consisting of cyclohexane-1,2-dicarboxylic anhydride and/or an alkyl ester of cyclohexane-1,2-dicarboxylic acid. In this case, the alkyl ester can be an alkyl ester of 1 to 12 carbon atoms.

The alkyl groups of the finally prepared cyclohexane-1,2-dicarboxyl diester preferably have 8 to 10 carbon atoms or 8 to 9 carbon atoms.

In case of preparing the cyclohexane-1,2-diester-based material of Formula 1 by the direct esterification reaction, the alcohol can be used in an amount of 2 to 10 mol, 2 to 8 mol, 2 to 6 mol or 2 to 5 mol with respect to 1 mol of the cyclohexane-1,2-dicarboxylic acid or the derivative thereof, and among them, 2 to 5 mol is preferably used.

The direct esterification reaction can be performed in the presence of a catalyst, and the catalyst can be one or more selected from the group consisting of an inorganic acid, an organic acid and a Lewis acid, and among them, one or more selected from the group consisting of an organic acid and Lewis acid can be used.

The inorganic acid can be one or more selected from the group consisting of sulfuric acid, hydrochloric acid and phosphoric acid.

The organic acid can be one or more selected from the group consisting of p-toluenesulfonic acid, methanesulfonic acid, ethanesulfonic acid, propanesulfonic acid, butanesulfonic acid and alkyl sulfuric acid.

The Lewis acid can be one or more selected from the group consisting of aluminum derivatives (aluminum oxide, aluminum hydroxide), tin derivatives (tin fatty acid of $C_3$ to $C_{12}$, tin oxide, tin hydroxide), titanium derivatives (tetraalkyl titanate of $C_3$ to $C_8$, titanium oxide, titanium hydroxide), lead derivatives (lead oxide, lead hydroxide), and zinc derivatives (zinc oxide, zinc hydroxide).

If the catalyst is a homogeneous catalyst, this catalyst can be used in an amount of 0.01 to 5 parts by weight or 0.01 to 3 parts by weight, preferably, 0.01 to 3 parts by weight among them with respect to 100 parts by weight of the sum of the cyclohexane-1,2-dicarboxylic acid or the derivative thereof and the alcohol.

If the catalyst is a heterogeneous catalyst, this catalyst can be used in an amount of 0.5 to 200 parts by weight or 0.5 to 100 parts by weight, preferably, 0.5 to 200 parts by weight among them with respect to 100 parts by weight of the sum of the cyclohexane-1,2-dicarboxylic acid or the derivative thereof and the alcohol.

The direct esterification reaction can be performed at 100 to 280° C., 130 to 250° C., or 150 to 230° C., preferably, 150 to 230° C. among them.

The direct esterification reaction can be performed for 3 to 30 hours or 3 to 25 hours, preferably, 3 to 25 hours among them.

Meanwhile, in case of preparing the cyclohexane-1,2-diester-based material by the transesterification reaction, the preparation can be performed through the transesterification reaction between the derivative of the cyclohexane-1,2-dicarboxylic acid and alcohol.

The derivative of the cyclohexane-1,2-dicarboxylic acid can be an alkyl ester of cyclohexane-1,2-dicarboxylic acid, preferably, a methyl ester of cyclohexane-1,2-dicarboxylic acid for easy separation of a reaction product.

The alcohol can be used in an amount of 2 to 10 mol, 2 to 8 mol, 2 to 6 mol or 2 to 5 mol, preferably, 2 to 5 mol among them, with respect to 1 mol of the derivative of the cyclohexane-1,2-dicarboxylic acid.

The transesterification reaction can be performed in the presence of a catalyst, and in this case, reaction time can be decreased.

The catalyst can be one or more selected from the group consisting of Lewis acid and an alkali metal.

The Lewis acid can be one or more selected from the group consisting of aluminum derivatives (aluminum oxide, aluminum hydroxide), tin derivatives (tin fatty acid of $C_3$ to $C_{12}$, tin oxide, tin hydroxide), titanium derivatives (tetraalkyl titanate of $C_3$ to $C_8$, titanium oxide, titanium hydroxide), lead derivatives (lead oxide, lead hydroxide), and zinc derivatives (zinc oxide, zinc hydroxide).

In addition, the alkali metal can be one or more selected from the group consisting of sodium alkoxide, potassium alkoxide, sodium hydroxide and potassium hydroxide, and the metal catalyst can be used alone, or a mixture of two or more catalysts thereof can be used.

The catalyst can be used in an amount of 0.01 to 5 parts by weight or 0.01 to 3 parts by weight, preferably, 0.01 to 3 parts by weight among them, with respect to 100 parts by weight of the sum of the derivative of the cyclohexane-1,2-dicarboxylic acid and the alcohol.

The transesterification reaction can be performed at 120 to 250° C., 135 to 230° C., or 140 to 220° C., preferably, 140 to 220° C. among them.

The transesterification reaction can be performed for 0.5 to 10 hours or 0.5 to 8 hours, preferably, 0.5 to 8 hours among them.

In order to promote the elution of water or a low alcohol such as methanol, which are produced by the direct esterification reaction or transesterification reaction, one or more selected from the group consisting of benzene, toluene, xylene and cyclohexane can be additionally injected, and commercially available nitrogen, etc., in an entrained form can be used for the same purpose.

The cyclohexane-1,2-diester-based material of Formula 1, prepared by the direct esterification reaction or transesterification reaction can be purified by performing a separate post treatment. The post treatment can be one or more selected from the group consisting of inactivation treatment (neutralization treatment, alkaline treatment), washing treatment, distillation (in decreased pressure or for dehydration treatment), and adsorption purification treatment.

Different from the above-described preparation method, a preparation method including the step of transforming a dialkyl phthalate-based material into a cyclohexane-1,2-diester-based material by conducting hydrogenation reaction in the presence of a metal catalyst, can be used.

The hydrogenation reaction step is a reaction for removing the aromaticity of a benzene ring of phthalate by adding hydrogen in the presence of a metal catalyst, and can be a kind of reduction reaction.

The hydrogenation reaction is for synthesizing a cyclohexane-1,2-diester-based material by reacting the phthalate-based material and hydrogen in the presence of a metal catalyst, and its reaction conditions can include all common reaction conditions which can hydrogenate only a benzene ring without affecting a carbonyl group which is substituted in benzene.

The hydrogenation reaction can be performed by further including an organic solvent such as ethanol, but is not limited thereto. The metal catalyst can use a Rh/C catalyst, a Pt catalyst, a Pd catalyst, etc., which are commonly used for hydrogenating a benzene ring, but any catalyst which is capable of conducting hydrogenation reaction can be used, without limitation.

2) Trimellitate-Based Material

The trimellitate-based material has a chemical structure of Formula 2 and can impart a plasticizer composition with eco-friendly properties and excellent safety. In addition, properties such as the migration resistance, volatile loss, tensile retention, elongation retention and oil resistance can be improved even further.

$R_3$ to $R_5$ can be the same or different, and can be each independently an alkyl group of 8 to 10 carbon atoms or an alkyl group of 8 to 9 carbon atoms, preferably, an alkyl group of 8 to 9 carbon atoms among them.

If the above-described conditions are satisfied, migration resistance, volatile loss, tension retention, oil resistance and stress migration can be improved even further.

$R_3$ to $R_5$ can be the same or different, and can be each independently one selected from the group consisting of an n-octyl group, an isooctyl group, a 2-ethylhexyl group, a n-nonyl group, an isononyl group, a 2-propylheptyl group and an isodecyl group, and among them, a 2-ethylhexyl group or an isononyl group is preferable. Meanwhile, if the alkyl group is a linear type, cold resistance can become excellent, and if the alkyl group is a branch type, economic feasibility can become excellent.

Meanwhile, the weight ratio of the cyclohexane-1,2-diester-based material of Formula 1 and the trimellitate-based material of Formula 2 can be 90:10 to 10:90, 80:20 to 20:80 or 70:30 to 30:50, preferably, 70:30 to 30:70 among them.

If the above-described amount is satisfied, equivalent or better degree of plasticization efficiency, migration resistance, volatile loss, tensile retention, elongation retention and oil resistance can be achieved when compared to diisodecyl phthalate.

In case of directly preparing the trimellitate-based material of Formula 2, the preparation can be performed by direct esterification reaction or transesterification reaction of trimellitic acid or the derivative thereof with an alcohol.

The derivative of the trimellitic acid can be one or more selected from the group consisting of trimellitic anhydride and an alkyl ester of trimellitic acid, and in this case, the alkyl ester can be an alkyl ester of 1 to 12 carbon atoms.

The alkyl group of the finally prepared trimellitate can have 8 to 10 carbon atoms, preferably, 8 to 9 carbon atoms.

In case of preparing the trimellitate-based material of Formula 2 by the direct esterification reaction, the alcohol can be used in an amount of 3 to 15 mol, 3 to 12 mol, 3 to 10 mol, 3 to 8 mol or 3 to 6 mol, preferably, 3 to 6 mol among them with respect to 1 mol of the trimellitic acid or the derivative thereof.

Explanation on the rest of the direct esterification reaction is the same as the explanation on the preparation method of the cyclohexane-1,2-diester-based material.

Meanwhile, in case of preparing the trimellitate-based material of Formula 2 by the transesterification reaction, the preparation can be performed by the transesterification reaction of the derivative of trimellitic acid and the alcohol. Here, the derivative of trimellitic acid can be an alkyl ester of the trimellitic acid.

The alcohol can be used in an amount of 3 to 15 mol, 3 to 12 mol, or 3 to 10 mol, preferably, 3 to 10 mol among them, with respect to 1 mol of the derivative of the trimellitic acid.

Explanation on the rest of the transesterification reaction is the same as the explanation on the preparation method of the cyclohexane-1,2-diester-based material.

3) Epoxidized Oil

The epoxidized oil can further improve the thermal stability, volatile loss, oil resistance and absorption rate of the plasticizer composition. In addition, the epoxidized oil can improve the mechanical properties of the plasticizer composition, such as tensile strength and elongation rate, and further, the improvement of heat resistance can be expected.

The epoxidized oil can be one or more selected from the group consisting of epoxidized soybean oil, epoxidized castor oil, epoxidized linseed oil, epoxidized palm oil, epoxidized stearate, epoxidized oleate, epoxidized tall oil and epoxidized linoleate, and among them, one or more selected from the group consisting of epoxidized soybean oil and epoxidized linseed oil is preferable.

The epoxidized oil can be included in an amount of 1 to 150 parts by weight, 5 to 125 parts by weight, 10 to 100 parts by weight, 10 to 80 parts by weight or 20 to 70 parts by weight, preferably, 20 to 70 parts by weight among them with respect to 100 parts by weight of the sum of the cyclohexane-1,2-diester-based material of Formula 1 and the trimellitate-based material of Formula 2. In addition, in case of additionally injecting the epoxidized oil to the two materials, limitations on achieving effects can be less when compared with the composition using the two materials, and accordingly, if the epoxidized oil is injected, the control of the amount ratio of the cyclohexane-1,2-diester-based material and the trimellitate-based material can become easier.

If the above-described amount is satisfied, the migration resistance and absorption rate of the plasticizer composition can be markedly improved, and the basic physical properties such as tensile strength and elongation rate can be kept to the equivalent degree to that of the conventional plasticizer or the plasticizer composition.

The epoxidized oil can be directly prepared or a commercially available material can be used.

4) Compound of Formula 3

The compound of Formula 3 can improve the processability of a polymer included in a molding material, that is, can decrease processing temperature or improve migration properties, in synergy with the cyclohexane-1,2-diester-based material of Formula 1. In addition, the compound of Formula 3 has excellent compatibility with a polymer to be plasticized and high durability, and is eco-friendly.

$R_6$ and $R_7$ can be each independently an alkyl group of 3 to 5 carbon atoms, and the alkyl group can be a linear or branched alkyl group.

$R_6$ and $R_7$ can be each independently n-propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl or 1-ethyl-propyl, and among them, n-butyl, isobutyl, n-pentyl, 2-methylbutyl or 3-methylbutyl is preferable, and n-butyl is more preferable.

X is a linear or branched alkylene group of 2 to 8 carbon atoms, or a linear or branched alkenylene group of 2 to 8 carbon atoms, containing at least one double bond.

In examples where X is a linear or branched alkylene group of 2 to 8 carbon atoms, a linear alkylene group of 2 to 5 carbon atoms is preferable, and a linear alkylene group of 3 to 4 carbon atoms is more preferable.

In examples where X is a linear or branched alkenylene group of 2 to 8 carbon atoms, containing at least one double bond, a linear or branched alkenylene group of 2 to 6 carbon atoms is preferable, and an alkenylene group of 2 to 4 carbon atoms is more preferable.

The compound of Formula 3 can be selected from the group consisting of di(n-butyl)glutarate, diisobutyl glutarate, di(n-pentyl)glutarate, di(2-methylbutyl)glutarate, di(3-methylbutyl)glutarate, di(n-butyl)adipate, di(n-butyl) adipate, diisobutyl adipate, di(n-pentyl)adipate, di(2-methylbutyl)adipate, and di(3-methylbutyl)adipate. Among them, di(n-butyl)adipate is preferable.

The weight ratio of the cyclohexane-1,2-diester-based material of Formula 1 and the compound of Formula 3 can be 1:1 to 20:1, preferably, 1.5:1 to 10:1, more preferably, 2:1 to 7:1.

If the above-described amount is satisfied, migration properties and stress resistance included in a molding material can be improved due to the synergy effect of the cyclohexane-1,2-diester-based material with the compound of Formula 3.

The compound of Formula 3 can be directly prepared or a commercially available material, for example, CETIOL B (product name, manufacturer: BASF SE) can be used.

2. Resin Composition

The resin composition according to another embodiment of the present invention includes 100 parts by weight of a resin, and 5 to 150 parts by weight of the plasticizer composition according to an embodiment of the present invention.

The resin can include one or more selected from the group consisting of an ethylene-vinyl acetate copolymer, polyethylene, polypropylene, polyketone, polyvinyl chloride, polystyrene, polyurethane and thermoplastic elastomer, and among them, polyvinyl chloride is preferable.

The resin composition can include the plasticizer composition in an amount of 5 to 150 parts by weight, 10 to 130 parts by weight, 10 to 100 parts by weight, 20 to 100 parts by weight, 20 to 80 parts by weight, 20 to 70 parts by weight or 20 to 60 parts by weight with respect to 100 parts by weight of the resin, and among them, 20 to 70 parts by weight or 20 to 60 parts by weight is preferable.

If the above-described amount is satisfied, a resin composition which is effective for all of a compound processing product, a calendaring processing product, and extrusion and injection processing, can be provided.

The resin composition can be used for manufacturing a wire, a flooring material, a car interior material, a film, a sheet or a tube.

Hereinafter, embodiments of the present invention will be described in detail so that a person skilled in the art can easily carry out the present invention. However, the embodiments according to the present invention can be changed into various other types, and should not be interpreted to limit the embodiments explained herein.

Preparation of cyclohexane-1,2-diester-Based Material

Preparation Example 1

To a four-neck, 3 liter reactor equipped with a cooler, a condenser, a decanter, a refluxing pump, a temperature controller and an agitator, 516.5 g of cyclohexane-1,2-dicarboxylic acid, 1,296 g of isononanol, and 1.55 g of tetraisopropyl titanate as a catalyst were injected, and the reaction temperature was set to 230° C. While continuously injecting a nitrogen gas, direct esterification reaction was performed for about 6 hours, and the reaction was finished at a point when an acid value reached 0.1.

After finishing the reaction, in order to remove an unreacted material, distillation extraction was performed in a reduced pressure. After performing distillation extraction, a neutralization process, a dehydration process and a filtering process were carried out to prepare 1,240 g (yield: 97%) of diisononyl cyclohexane-1,2-dicarboxylate.

Preparation of Trimellitate-Based Material

Preparation Example 2

The same method as in Preparation Example 1 was performed except for injecting 384 g of trimellitic anhydride and 1,170 g of 2-ethylhexanol to the reactor to produce 1,060 g (yield 97%) of tri(2-ethylhexyl) trimellitate (TEHTM).

Preparation Example 3

The same method as in Preparation Example 1 was performed except for injecting 384 g of trimellitic anhydride and 1,296 g of isononanol to the reactor to produce 1,140 g (yield 97%) of triisononyl trimellitate (TINTM).

One or more selected from the group consisting of the cyclohexane-1,2-diester-based material prepared in Preparation Example 1, the tris(2-ethylhexyl) trimellitate prepared in Preparation Example 2, the triisononyl trimellitate prepared in Preparation Example 3, an epoxidized oil, diisodecyl phthalate (DIDP) and alkylsulfonic phenyl ester (ASPE, CAS No. 91082-17-6) were mixed to prepare the plasticizer compositions of the Examples and the Comparative Examples, and the particulars are summarized in Table 1 below. The evaluation of the physical properties of the plasticizer compositions was carried out according to experimental items below. As materials other than the materials prepared in the Preparation Examples, commercially available products were used.

TABLE 1

| Division | Cyclohexane-1,2-diester-based material Kind | Amount[1] | Trimellitate-based material Kind | Amount | Epoxidized oil Kind | Amount | DIDP | ASPE |
|---|---|---|---|---|---|---|---|---|
| Example 1 | Preparation Example 1 | 30 | Preparation Example 2 | 70 | — | — | — | — |
| Example 2 | Preparation Example 1 | 50 | Preparation Example 2 | 50 | — | — | — | — |
| Example 3 | Preparation Example 1 | 70 | Preparation Example 2 | 30 | — | — | — | — |
| Example 4 | Preparation Example 1 | 40 | Preparation Example 3 | 60 | — | — | — | — |
| Example 5 | Preparation Example 1 | 60 | Preparation Example 3 | 40 | — | — | — | — |
| Example 6 | Preparation Example 1 | 30 | Preparation Example 2 | 30 | ESO[2] | 40 | — | — |
| Example 7 | Preparation Example 1 | 30 | Preparation Example 2 | 40 | ESO | 30 | — | — |
| Example 8 | Preparation Example 1 | 30 | Preparation Example 2 | 50 | ESO | 20 | — | — |
| Example 9 | Preparation Example 1 | 50 | Preparation Example 3 | 30 | ESO | 20 | — | — |
| Example 10 | Preparation Example 1 | 40 | Preparation Example 3 | 50 | ESO | 10 | — | — |
| Example 11 | Preparation Example 1 | 40 | Preparation Example 3 | 10 | ESO | 50 | — | — |
| Comparative Example 1 | — | — | — | — | — | — | 100 | — |
| Comparative Example 2 | Preparation Example 1 | 100 | — | — | — | — | — | — |
| Comparative Example 3 | Preparation Example 1 | 50 | — | — | ESO | 50 | — | — |
| Comparative Example 4 | Preparation Example 1 | 50 | — | — | — | — | — | 50 |
| Comparative Example 5 | — | — | Preparation Example 2 | 100 | — | — | — | — |
| Comparative Example 6 | — | — | Preparation Example 2 | 30 | ESO | 70 | — | — |
| Comparative Example 7 | — | — | Preparation Example 3 | 90 | ESO | 10 | — | — |

1) All amounts in Table 1 are wt %.
1) ESO: Epoxidized soybean oil (CAS No: 8013-07-8)
<Experiment Items>
Measurement of Hardness (Shore "A")
Based on ASTM D2240, the hardness of a specimen with a thickness of 3 mm was measured for 10 seconds.
Measurement of Migration Loss (%)
Based on KSM-3156, PS plates were attached onto both sides of a specimen with a thickness of 1 mm, and a load of 2 kg f/cm² was applied. The specimen was placed in a hot air convention oven (80° C.) for 72 hours, and then was taken out and cooled at room temperature. After that, the PS plates attached onto both sides of the specimen were removed, and the weights of the specimen before and after being placed in the oven were measured. A migration loss value was calculated through substitution in Equation 1 below.

Migration loss (%)=[(initial weight of specimen before experiment)−(weight of specimen after experiment)]/(initial weight of specimen before experiment)×100    <Equation 1>

Evaluation of Stress
The specimen with a thickness of 2 mm was stood in a bent state for 168 hours, migration degree (degree of oozed out) was observed, and the results were recorded. The closer to 0 the value was, the better properties were shown.
Measurement of Volatile Loss (%)
The specimen with a thickness of 1 mm was exposed to 113° C. for 168 hours, and the weight of the specimen was measured, and a volatile loss value was calculated through substitution in Equation 2 below.

Volatile loss (%)=[(initial weight of specimen)−(weight of specimen after working)]/(initial weight of specimen)×100    <Equation 2>

Measurement of Tensile Strength (kg f/cm²)
Based on ASTM D638, a specimen with a thickness of 1 mm was pulled using U.T.M (product name: 4466, manufacturer: Instron) in a cross head speed of 200 mm/min. A point when the specimen was cut was measured.
Measurement of Elongation Rate (%)
Based on D638, a specimen with a thickness of 1 mm was pulled using U.T.M (product name: 4466, manufacturer: Instron) in a cross head speed of 200 mm/min. A point when the specimen was cut was measured. Elongation rate was calculated through substitution in Equation 3 below.

Elongation rate (%): [(length at cut point of specimen)/(initial length)]×100    <Equation 3>

Measurement of Tensile and Elongation Retention
For the measurement of tensile and elongation retention, heat was applied at 100° C. for 168 hours, and tensile strength and elongation rate remaining in the specimen were measured. Measurement methods were the same as the measurement methods of tensile strength and elongation rate.
Experimental Example: Evaluation of Physical Properties
Using the plasticizer compositions of the Examples and the Comparative Examples shown in Table 1, specimens were manufactured, and with respect to each specimen, the experimental items were evaluated, respectively. The results are shown in Table 2 and Table 3 below.
For the manufacture of the specimen based on ASTM D638, 100 parts by weight of polyvinyl chloride (product name: LS100, manufacturer: LG Chem,), 50 parts by weight of the plasticizer composition prepared in each of the Examples and the Comparative Examples, 40 parts by weight of a filler (product name: Omyacrab 1T®, 5 manufacturer: OMYA), 5 parts by weight of a stabilizer (product name: RUP-144, manufacturer: ADEKA), and 0.3 parts by weight of a lubricant (product name: ST-A, manufacturer: Isu Chemical Co.) were mixed and stirred at 98° C. in a speed of 700 rpm for mixing, roll-milled at 160° C. for 4 minutes, and worked using a press at 180° C. for 3 minutes (low pressure) and for 2.5 minutes (high pressure), to manufacture a specimen 10 with a thickness of 1 mm and a specimen with a thickness of 3 mm, respectively.

TABLE 2

| Division | Hardness (Shore "A") | Migration loss (%) | Stress migration | Volatile loss (%) |
|---|---|---|---|---|
| Example 1 | 93.5 | 0.72 | 1.0 | 3.62 |
| Example 2 | 93.0 | 0.81 | 1.5 | 3.80 |
| Example 3 | 92.5 | 0.83 | 1.5 | 4.58 |
| Example 4 | 93.7 | 0.90 | 1.0 | 3.56 |
| Example 5 | 93.0 | 0.85 | 1.5 | 4.32 |
| Example 6 | 92.6 | 0.62 | 0.5 | 2.28 |
| Example 7 | 92.8 | 0.60 | 0 | 2.35 |
| Example 8 | 93.1 | 0.43 | 0.5 | 2.30 |
| Example 9 | 92.3 | 0.88 | 0.5 | 3.30 |
| Example 10 | 92.8 | 0.90 | 0.5 | 3.10 |
| Example 11 | 92.0 | 0.35 | 0 | 2.67 |
| Comparative Example 1 | 93.2 | 1.17 | 1.5 | 4.66 |
| Comparative Example 2 | 91.2 | 2.34 | 2.0 | 8.65 |
| Comparative Example 3 | 92.5 | 1.35 | 2.0 | 5.68 |
| Comparative Example 4 | 89.3 | 4.62 | 3.0 | 10.27 |
| Comparative Example 5 | 96.3 | 0.65 | 1.0 | 3.42 |
| Comparative Example 6 | 94.1 | 0.48 | 1.0 | 3.66 |
| Comparative Example 7 | 96.7 | 0.69 | 2.0 | 2.03 |

TABLE 3

| Division | Tensile strength (kgf/cm²) | Tensile retention (%) | Elongation rate (%) | Elongation retention (%) |
|---|---|---|---|---|
| Example 1 | 203.3 | 98.3 | 280.3 | 95.3 |
| Example 2 | 196.0 | 102.0 | 286.1 | 94.3 |
| Example 3 | 189.0 | 103.4 | 294.3 | 93.0 |
| Example 4 | 199.6 | 100.2 | 276.5 | 97.8 |
| Example 5 | 193.2 | 108.3 | 290.1 | 96.4 |
| Example 6 | 204.6 | 98.9 | 288.3 | 102.3 |
| Example 7 | 208.9 | 97.5 | 291.0 | 100.2 |
| Example 8 | 215.3 | 98.0 | 292.3 | 98.9 |
| Example 9 | 203.4 | 100.3 | 298.4 | 98.0 |
| Example 10 | 196.8 | 102.4 | 288.7 | 98.5 |
| Example 11 | 196.0 | 97.7 | 286.4 | 100.5 |
| Comparative Example 1 | 188.7 | 96.6 | 270.1 | 93.2 |
| Comparative Example 2 | 158.3 | 92.0 | 303.0 | 86.0 |
| Comparative Example 3 | 176.2 | 96.4 | 281.5 | 89.6 |
| Comparative Example 4 | 150.1 | 110.3 | 300.2 | 73.2 |
| Comparative Example 5 | 205.1 | 94.7 | 265.4 | 91.6 |
| Comparative Example 6 | 190.0 | 94.0 | 267.2 | 92.5 |
| Comparative Example 7 | 192.3 | 95.7 | 278.5 | 97.6 |

Referring to Tables 2 and 3, Example 1 to Example 5, which included only the cyclohexane-1,2-diester-based material and the trimellitate-based material, and Example 6 to Example 11, which included the cyclohexane-1,2-diester-based material, the trimellitate-5 based material, and the epoxidized oil, accomplished equivalent degree of hardness (plasticization efficiency) to that of Comparative Example 1 using DIDP, and markedly excellent migration loss, stress migration, volatile loss, tensile strength, tensile retention, elongation rate and elongation retention without making a loss in plasticization efficiency.

In addition, Comparative Example 2 which included only the cyclohexane-1,2-diester-based material was found to show markedly degraded physical properties when compared with the Examples. Comparative Example 3 which included the cyclohexane-1,2-diester-based material and the epoxidized oil was found to show equivalent degrees of hardness, tensile retention and elongation rate to those of the Examples but markedly degraded physical properties besides them.

In addition, Comparative Example 4 which included the cyclohexane-1,2-diester-based material and the alkylsulfonic phenyl ester showed higher tensile retention when compared with that of the Examples, but this is only due to the disappearance (aging) of soft properties through hardening of a specimen by the decrease of a remaining plasticizer in a specimen because of high volatile loss.

Comparative Example 5 which included only the trimellitate-based material was found to show equivalent degrees of tensile strength, migration loss, stress migration and volatile loss, but hardness (plasticization efficiency) was significantly poor and tensile retention was degraded, and thus, mechanical properties were disappeared at high temperature environments, and was found to show markedly degraded tensile retention and more drastically degraded tensile retention though elongation rate was low, due to high temperature environments, thereby showing inferior soft properties.

Comparative Example 6 which included the trimellitate-based material and the epoxidized oil but excessive amount of the epoxidized oil also showed equivalent degrees of hardness, migration loss, stress migration and volatile loss but markedly degraded tensile strength, tensile retention, elongation rate and elongation retention when compared with the Examples, and was found that basic physical properties were not good and at the same time, even the poor physical properties could not be kept at high temperature environments.

In addition, Comparative Example 7 which included the trimellitate material and the epoxidized oil, but an excessive amount of the trimellitate-based material, showed equivalent degrees or better migration loss, volatile loss, elongation rate and tensile retention but degraded hardness, stress migration, tensile strength and tensile retention when compared with the Examples.

Through this, in case of applying the plasticizer compositions of the Examples, it could be confirmed that the plasticization efficiency is basically equivalent or better degree when compared with the conventional product and an excellent replacement could be obtained, excellent physical properties can be kept at high temperature environments considering excellent degrees of basic tensile strength and elongation rate and high tensile retention and elongation retention, and migration properties (migration loss and stress migration) and volatile loss properties are excellent and the loss of a plasticizer can be minimized.

The invention claimed is:
1. A plasticizer composition, comprising:
   a cyclohexane-1,2-diester-based material of the following Formula 1; and
   a trimellitate-based material of the following Formula 2:

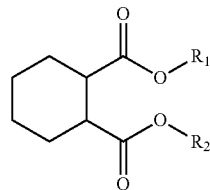

[Formula 1]

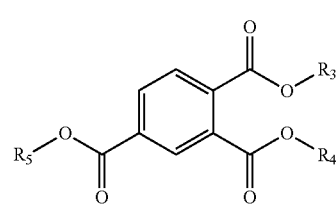

[Formula 2]

wherein in Formula 1 and Formula 2:
$R_1$ to $R_5$ are each independently an alkyl group of 8 to 10 carbon atoms, and
wherein (1) $R_1$ and $R_2$ are different from each other and $R_3$, $R_4$ and $R_5$ are the same;
(2) $R_1$ and $R_2$ are the same and $R_3$, $R_4$ and $R_5$ are different from each other;
(3) $R_1$ and $R_2$ are the same and the two kinds selected from $R_3$, $R_4$ and $R_5$ are the same with each other, and different from the remaining one kind;
(4) $R_1$ to $R_5$ are different from each other; or
(5) $R_1$ and $R_2$ are different from each other, and the two kinds selected from $R_3$, $R_4$ and $R_5$ are the same with each other, and different from the remaining one kind.

2. The plasticizer composition according to claim 1, wherein a weight ratio of the cyclohexane-1,2-diester-based material of Formula 1 and the trimellitate-based material of Formula 2 is 90:10 to 10:90.

3. The plasticizer composition according to claim 1, wherein a weight ratio of the cyclohexane-1,2-diester-based material of Formula 1 and the trimellitate-based material of Formula 2 is 80:20 to 20:80.

4. The plasticizer composition according to claim 1, wherein the plasticizer composition further comprises an epoxidized oil.

5. The plasticizer composition according to claim 4, wherein the epoxidized oil is one or more selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

6. The plasticizer composition according to claim 4, wherein 1 to 150 parts by weight of the epoxidized oil is present with respect to 100 parts by weight of a sum of the cyclohexane-1,2-diester-based material of Formula 1 and the trimellitate-based material of Formula 2.

7. The plasticizer composition according to claim 1, wherein the plasticizer composition further comprises a compound of the following Formula 3:

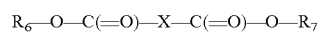

[Formula 3]

wherein in Formula 3:
X is a linear or branched alkylene group of 2 to 8 carbon atoms, or a linear or branched alkenylene group of 2 to 8 carbon atoms containing at least one double bond; and
$R_6$ and $R_7$ are each independently an alkyl group of 3 to 5 carbon atoms.

8. The plasticizer composition according to claim 7, wherein a weight ratio of the cyclohexane-1,2-diester-based material of Formula 1 and the compound of Formula 3 is 1:1 to 20:1.

9. The plasticizer composition according to claim 1, wherein $R_1$ to $R_5$ are each independently an alkyl group of 8 to 9 carbon atoms.

10. The plasticizer composition according to claim 1, wherein $R_1$ to $R_5$ are each independently one selected from the group consisting of an n-octyl group, an isooctyl group, a 2-ethylhexyl group, a n-nonyl group, an isononyl group, a 2-propylheptyl group and an isodecyl group.

11. A resin composition, comprising:
100 parts by weight of a resin; and
5 to 150 parts by weight of the plasticizer composition according to claim 1.

12. The resin composition according to claim 11, wherein the resin comprises one or more selected from the group consisting of an ethylene-vinyl acetate copolymer, polyethylene, polypropylene, polyketone, polyvinyl chloride, polystyrene, polyurethane and a thermoplastic elastomer.

* * * * *